United States Patent [19]

Takeuchi et al.

[11] Patent Number: 4,950,381

[45] Date of Patent: Aug. 21, 1990

[54] POLYSILAZANE AND METHOD FOR SYNTHESIS THEREOF

[75] Inventors: Hiroyuki Takeuchi; Kaneo Noake, both of Minamata; Tamio Serita, Chiba, all of Japan

[73] Assignee: Chisso Corporation, Japan

[21] Appl. No.: 205,277

[22] Filed: Jun. 10, 1988

[30] Foreign Application Priority Data

Jun. 12, 1987 [JP] Japan ................ 62-146657

[51] Int. Cl.$^5$ ............................................ C08G 77/00
[52] U.S. Cl. ......................................... 528/10; 528/28; 528/32; 528/34; 528/38; 528/33; 528/43
[58] Field of Search ............... 528/10, 28, 34, 38, 528/33, 32, 43

[56] References Cited

U.S. PATENT DOCUMENTS

| | | | |
|---|---|---|---|
| 2,564,674 | 8/1951 | Cheronis | 260/448.2 |
| 2,579,418 | 12/1951 | Cheronis | 260/2 |
| 3,036,019 | 5/1962 | Molotsky | 260/2 |
| 3,143,514 | 8/1964 | Boyer | 260/2 |
| 4,255,549 | 3/1981 | Christophliemk et al. | 528/28 |
| 4,482,669 | 11/1984 | Seyferth et al. | 524/442 |
| 4,771,118 | 9/1988 | Takamizawa et al. | 528/28 |

FOREIGN PATENT DOCUMENTS 60-226890  11/1985  Japan .

*Primary Examiner*—Melvyn I. Marquis
*Attorney, Agent, or Firm*—Leydig, Voit & Mayer

[57] ABSTRACT

There is provided a new polysilazane product from a specific precursor. Desired molecular weight of the polysilazane can be obtained by selecting the proper molar ratio of $R_1SiHX_2$ and $R_2R_3SiX_2$ as raw materials. The polysilazane is stable during storage without gelation. The polymerization of the precursor can be carried out without gelation even at a high temperature and hence can be completed in a short time. The polysilazane can be made into ceramic fibers by spinning from a solution and subsequent firing.

6 Claims, No Drawings

POLYSILAZANE AND METHOD FOR SYNTHESIS THEREOF

BACKGROUND OF THE INVENTION

1. Field of the Invention:

The present invention relates to a new polysilazane useful for the production of $Si_3N_4/SiC$ ceramics, a molded article produced from said polysilazane, a process for producing said polysilazane, and a process for pyrolyzing said polysilazane into a ceramic material.

2. Description of the Prior Art:

Nowadays, silicon nitride, silicon carbide, and a mixture thereof are attracting considerable attention as ceramic materials. Research is being carried out to produce such ceramic materials, especially ceramic fiber, by pyrolyzing a polysilazane whose main chain is composed of nitrogen and silicon. According to a known technology disclosed in Japanese Patent Laid-open No. 226890/1985, an organic silazane polymer is produced by reacting anhydrous ammonia with $RSiHX_2$ in a solution, thereby forming a cyclic or linear precursor, and reacting this precursor in the presence of a basic catalyst capable of deprotonating hydrogen from a nitrogen atom adjacent to a silicon atom, thereby forming the $Si_2N_2$ bridge. This procedure is accomplished by, for example, blowing ammonia gas into methyldichlorosilane cooled in diethyl ether to bring about ammonolysis, filtering off the resulting ammonium chloride precipitates, and distilling away ether from the filtrate under reduced pressure, thereby obtaining a precursor having the skeletal repeating unit of the formula:

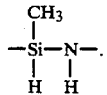

Having a number-average molecular weight of about 300, this precursor is considered to be a cyclic compound composed of about 5 skeletal repeating units. This precursor polymerizes, giving off hydrogen gas, when added, with stirring, dropwise to a tetrahydrofuran solution in which is suspended potassium hydride (KH). This is elucidated as follows by the inventors, Seyferth et al.

At first, the following reaction forms the amide functional group.

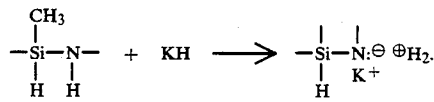

A pair of such functional groups join to each other to form a four-membered $Si_2N_2$ ring, permitting the metal hydride to be regenerated.

Upon the addition of methyl iodide ($CH_3I$) to the reaction system after the completion of the following reaction:

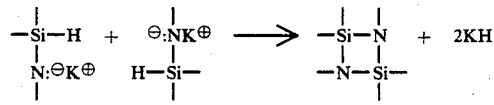

the amide functional group reacts with methyl iodide, forming potassium iodide precipitates.

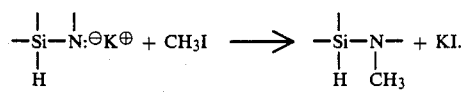

By centrifugally removing the potassium iodide precipitates and distilling away the solvent, there is obtained a polymer in the form of white powder. This polymer is found to have, for example, the following composition according to proton NMR and elemental analysis.

This composition may be represented by the following model.

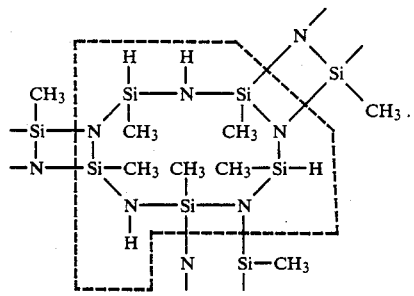

The structure enclosed by the broken line denotes the residue unit of the precursor.

Unfortunately, the above-mentioned process has some disadvantages. That is, when the precursor is polymerized in the presence of a metal hydride catalyst, the crosslinking reaction proceeds to such an extent that the polymer gels into an insoluble jelly. This makes it difficult to control the molecular weight and also makes the reaction less reproducible. Thus the resulting polymer is unstable and becomes insoluble as the result of crosslinking which proceeds with time. Therefore, it has poor storage properties. In addition, the polymerization reaction has to be carried out carefully at a low temperature (below 30° C.) because gelation takes place in a very short time if it is carried out at, say, 66° C. (the reflux temperature of tetrahydrofuran). The polymerization reaction takes a long time before a desired molecular weight is reached.

SUMMARY OF THE INVENTION

In order to overcome the above-mentioned disadvantages, the present inventors carried out research, which led to the findings that the disadvantages in the prior art arise from the fact that the precursor contains excessive crosslinking sites and that the number of crosslinking sites can be limited by a proper means. The present invention was completed on the basis of these findings.

The first aspect of the present invention is concerned with a polysilazane having the skeleton composed of the repeating units of the formula:

in which polysilazane, the precursor residues, each composed of the repeating units of the formula:

are connected to one another through the structural unit of the formula:

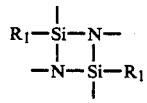

characterized in that said precursor is composed of the units of the formulas:

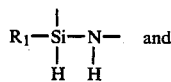

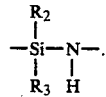

The second aspect of the present invention is concerned with a process for producing a polysilazane which comprises the first step of reacting anhydrous ammonia with a mixture of organohalosilanes represented by $R_1SiHX_2$ and $R_2R_3SiX_2$ in solution, thereby forming a cyclic or linear silazane precursor, and the second step of deprotonating, cyclizing, and crosslinking said precursor in the presence of a basic catalyst capable of deprotonating hydrogen from a nitrogen atom adjacent to a silicon atom, thereby forming a polymer.

In the above formulas, $R_1$, $R_2$, and $R_3$ *l represents hydrogen (except for $R_2$ and $R_3$)*,; a lower alkyl group having 1 to 6 carbon atoms such as methyl group, ethyl group, n-propyl group, and isopropyl group; a substituted or unsubstituted vinyl group; a substituted or unsubstituted allyl group; a substituted or unsubstituted lower aryl group having 6 to 10 carbon atoms such as phenyl group, tolyl group, and xylyl group; tri(lower)alkyl- or di(lower)alkylsilyl such as trimethyl-, dimethyl-, methyl-ethyl-, and triethyl-silyl groups; and di(lower)alkylamino group such as dimethyl-, diethyl-, methylethyl-, and diisopropyl-amino groups; with $R_1$, $R_2$, and $R_3$ being the same or different from one another; and X denotes a halogen such as chlorine and bromine. (The same shall apply hereinafter.)

The basic catalyst capable of deprotonating hydrogen from a nitrogen atom adjacent to a silicon atom in the precursor includes metal hydrides such as potassium hydride, sodium hydride, and lithium aluminum hydride ($LiAlH_4$), and metals such as lithium, sodium, and potassium.

DETAILED DESCRIPTION OF THE INVENTION

The new polysilazane of the present invention is required to be produced from a precursor which is composed of a unit represented by the formula:

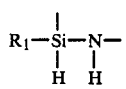 (A)

and a unit represented by the formula:

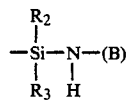

The content of the unit (B) in the precursor should preferably be 1~60 mol%, and the polysilazane should contain the crosslink structural unit represented by the formula:

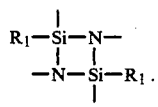

The present invention produces the following effects.

(1) It is possible to produce the polymer having a desired molecular weight almost invariably by properly selecting the molar ratio of the raw materials $R_1SiHX_2$ and $R_2R_3SiX_2$.

(2) The finished polymer changes very little with time, and hence it can be stored for a long time without gelation.

(3) The polymerization can be carried out without gelation even at the reflux temperature of tetrahydrofuran, and hence the polymerization time can be shortened.

The reason why the present invention produces the above-mentioned effects may be explained as follows: The precursor produced by ammonolysis of methyldichlorosilane according to the prior art is a cyclic compound which is composed of about 5 structural units of the formula:

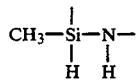

and has five crosslink reaction sites. If all of them take part in reaction, the reaction product is a crosslinked polymer having a three-dimensional network. Apparently, it is an insoluble gel. The compound should ideally be one which has two reaction sites, so that it forms a linear polymer through linkage. Such a polymer should be soluble and capable of spinning. The essential requirement for the reaction site is that a hydrogen atom be connected to each adjoining silicon atom and nitrogen atom. In the case where a mixture of methyldichlorosilane and dimethyldichlorosilane is subjected to ammonolysis according to the present invention, the resulting precursor contains a unit represented by the formula:

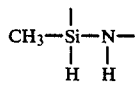

which can be the reaction site, and a unit represented by the formula:

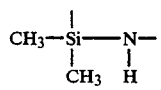

which cannot be the reaction site. It follows, therefore, that the number of reaction sites can be controlled by adjusting the amount of dimethyldichlorosilane to be added.

The invention is now described with reference to the following examples and comparative examples.

EXAMPLES

First step: In a 1-liter four-necked flask equipped with a stirrer, gas inlet tube, dry ice condenser, and thermometer, with the system completely dried and the atmosphere replaced with nitrogen, was placed 500 ml of tetrahydrofuran (THF) which had been freshly purified by distillation in the presenc of lithium aluminum hydride (LiAlH$_4$). To the flask were added methyldichlorosilane and dimethyldichlorosilane in a prescribed amount as shown in Table 1. After dissolution, the solution was bubbled with ammonia gas (dried by passing through a sodium hydroxide column) at a flow rate of 3 ml/min. During bubbling, the solution was stirred and kept at 35° C. When the solution became saturated with ammonia and the heat generation came to a halt, the blowing of ammonia gas was suspended. The solution was stirred overnight to expel excess ammonia. Ammonium chloride precipitates formed by the reaction were filtered off and THF was distilled away from the filtrate. Thus there was obtained a silazane oligomer precursor in a 90% yield. It was found to have a number-average molecular weight (Mn) of about 300 (n≈4.7) according to GPC on the assumption that it is represented by the formula:

$$\{(CH_3HSiNH)_{1-z}[(CH_3)_2SiNH]_z\}_n$$

where z denotes the molar fraction of the [(CH$_3$)$_2$SiNH] unit.

TABLE 1

| No. | CH$_3$SiHCl$_2$ g (X mole) | (CH$_3$)$_2$SiCl$_2$ g (Y mole) | Molar ratio X/Y (z × 100%) | Mn | n |
| --- | --- | --- | --- | --- | --- |
| 1 | 81.3 (0.707) | 132.4 (1.026) | 0.69 (59) | 319 | 4.75 |
| 2 | 108.7 (0.945) | 94.4 (0.732) | 1.29 (44) | 324 | 4.97 |
| 3 | 81.4 (0.707) | 36.2 (0.281) | 2.52 (28) | 270 | 4.29 |
| 4 | 135.6 (1.179) | 40.5 (0.314) | 3.75 (21) | 282 | 4.55 |
| 5 | 83.8 (0.729) | 15.7 (0.122) | 5.98 (14) | 304 | 4.99 |
| 6 | 102.1 (0.888) | 16.1 (0.125) | 7.10 (12) | — | — |

Second step: In a 500-ml three-necked flask equipped with a stirrer, dropping funnel, and condenser, was placed potassium hydride (KH) in an amount as shown in Table 2. With the system completely dried and the atmosphere replaced with nitrogen, 200 ml of tetrahydrofuran (THF) which had been freshly purified by distillation in the presence of lithium aluminum hydride was placed in the flask so that KH was suspended by stirring. To the flask was added dropwise from the dropping funnel 100 ml of THF containing a prescribed amount of the silazane oligomer precursor obtained in the first step. The dropwise addition was continued over about 30 minutes, with the solution temperature kept at 30° C. The solution temperature was raised to 66° C (the boiling point of THF) and reaction was carried out for 20 hours under refluxing. The results are shown in Table 2. The precursor was stirred for a long time to see if gelation had taken place. No gelation took place in experiment Nos. 1≈4; however, a small amount of insoluble matter occurred in experiment No. 5 and gelation took place in experiment No. 6. The precursor which remained free of gelation was quenched with methyl iodide and then stored for 30 days to see if any change occurs in average molecular weight (Mn). It was confirmed that no change occurred with time.

TABLE 2

| No. | Precursor (g) | KH (mg) | Mn | Polymer form | After stirring for a long time |
| --- | --- | --- | --- | --- | --- |
| 1 | 20 | 110 | 695 | Oily | No gelation |
| 2 | 20 | 204 | 1153 | Waxy | No gelation |
| 3 | 15 | 134 | 1855 | Powdery | No gelation |
| 4 | 50 | 241 | 2860 | Powdery | No gelation |
| 5 | 45 | 252 | 6600 | Powdery | No gelation (some insolubles) |
| 6 | 50 | 284 | 5700 | Powdery | Gelation |

COMPARATIVE EXAMPLE

CH$_3$SiHCl$_2$ alone was subjected to ammonolysis according to the procedure of the first step in the example. The resulting precursor was polymerized according to the procedure of the second step in the example. Gelation took place after polymerization at 30° C. for 16 hours. Also, gelation took place within 10 minutes when the polymerization temperature was raised to 66° C.

EXAMPLE OF SPINNING

The polymer (having a number-average molecular weight of 2860) indicated by No. 4 in Table 2 was dissolved in toluene, and the toluene solution was made into green fiber (unfired fiber) by dry spinning. Two hundred pieces of the green fiber in a bundle, with a 2-g weight attached, were fired in a vertical tubular electric furnace. There was obtained a ceramic fiber.

What is claimed is:

1. An organic polymer comprising a polysilazane derived from a mixture of organohalosilanes comprising solely those represented by the formulas R$_1$SiHX$_2$ and R$_2$R$_3$SiX$_2$ and having cyclic units with the skeletal backbone units:

formed from the units:

and

the cyclic units joined to one another by units:

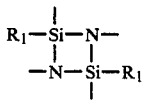

wherein $R_1$, $R_2$, $R_3$ each represents a lower alkyl group having 1 to 6 carbon atoms, a substituted or unsubstituted vinyl group, a substituted or unsubstituted allyl group, a substituted or unsubstituted lower aryl group having 6 to 10 carbon atoms, or tri (lower)alkyl- or di(lower)alkylsilyl group, or di(lower)alkyl-amino group, with $R_1$, $R_2$, and $R_3$ being the same or different from one another.

2. A polysilazane as claimed in claim 1, wherein the content of the unit (B) in said precursor is $1 \approx 60$ mol%.

3. A polysilazane as claimed in claim 1, wherein $R_1$, $R_2$, and $R_3$ in said each formula are all methyl group.

4. A process for producing a polysilazane which comprises:
(a) a reacting anhydrous ammonia with a mixture of organohalosilanes comprising solely those represented by the formulas $R_1SiHX_2$ and $R_2R_3SiX_2$ in a solution, thereby forming a cyclic or linear silazane precursor, and
(b) deprotonating, cyclizing, and crosslinking said precursor in the presence of a basic catalyst capable of deprotonating hydrogen from a nitrogen atom adjacent to a silicon atom, thereby forming a polymer wherein $R_1$, $R_2$ and $R_3$ each represents a lower alkyl group having 1 to 6 carbon atoms, a substituted or unsubstituted vinyl group, a substituted or unsubstituted allyl group, a substituted or unsubstituted lower aryl group having 6 to 10 carbon atoms, or tri(lower)alkyl- or di(lower)alkylsilyl group, or di(lower)alkyl-amino group, with $R_1$, $R_2$, and $R_3$ being the same or different from one another and X represents a halogen atom.

5. A process for producing a polysilazane as claimed in claim 4, wherein the molar ratio of $R_1SiHX_2$ to $R_2R_3SiX_2$ is 2:3 to 100:1.

6. A process for producing a polysilazane as claimed in claim 4, wherein $R_1$, $R_2$, and $R_3$ in said each formula are all methyl group.

* * * * *